US007065371B1

(12) United States Patent
Kleinerman

(10) Patent No.: US 7,065,371 B1
(45) Date of Patent: Jun. 20, 2006

(54) CHANNEL ORDER SELECTION AND CHANNEL ESTIMATION IN WIRELESS COMMUNICATION SYSTEM

(75) Inventor: Alexander Kleinerman, Natania (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 558 days.

(21) Appl. No.: 10/372,060

(22) Filed: Feb. 20, 2003

(51) Int. Cl.
*H04Q 7/20* (2006.01)
(52) U.S. Cl. .................. 455/464; 455/435.2; 455/515; 375/346
(58) Field of Classification Search ................ 455/464, 455/515, 516, 115.1, 115.2, 435.2, 452.2, 455/509, 511; 375/346, 231, 229, 230
See application file for complete search history.

(56) References Cited

U.S. PATENT DOCUMENTS

| | | | | |
|---|---|---|---|---|
| 5,272,727 A | * | 12/1993 | Okanoue | 375/341 |
| 5,432,816 A | * | 7/1995 | Gozzo | 375/232 |
| 5,903,610 A | * | 5/1999 | Skold et al. | 375/285 |
| 6,373,888 B1 | * | 4/2002 | Lindoff | 375/231 |
| 6,496,535 B1 | * | 12/2002 | Xu | 375/219 |
| 6,507,602 B1 | * | 1/2003 | Dent | 375/142 |
| 6,647,003 B1 | * | 11/2003 | Abeta et al. | 370/335 |
| 6,647,055 B1 | | 11/2003 | Kuo | 375/148 |
| 6,671,313 B1 | * | 12/2003 | Rached et al. | 375/224 |
| 6,757,272 B1 | * | 6/2004 | Abeta et al. | 370/342 |
| 6,765,969 B1 | * | 7/2004 | Vook et al. | 375/259 |
| 6,862,326 B1 | * | 3/2005 | Eran et al. | 375/343 |
| 6,907,092 B1 | * | 6/2005 | Yakhnich et al. | 375/346 |

\* cited by examiner

*Primary Examiner*—Tilahun Gesesse
*Assistant Examiner*—Tan Trinh
(74) *Attorney, Agent, or Firm*—Zaretsky & Associates PC; Howard Zaretsky

(57) ABSTRACT

A novel and useful apparatus for and method of determining the channel order and channel estimate in a communications system. The present invention is suitable for use with a wide range of channels and is particularly useful in estimating wireless channels such as GSM and other types of cellular channels. A channel estimate is performed on the entire received training sequence. Those taps having an energy larger than the energy of a channel estimation error quantity are selected for the final channel estimation model. The estimation error is calculated by dividing the complete received training sequence into two different portions, wherein both portions are of equal size. A channel estimate is used to calculate the channel estimate of both portions which are then used to calculate the channel estimation error quantity.

46 Claims, 9 Drawing Sheets

CHANNEL ORDER SELECTION AND CHANNEL ESTIMATION IN WIRELESS COMMUNICATION SYSTEM

FIELD OF THE INVENTION

The present invention relates generally to communication systems and more particularly relates to a channel order selection and channel estimation scheme. The scheme is particularly useful in estimating the channel order in wireless communications systems for use with channel estimation methods.

BACKGROUND OF THE INVENTION

In recent years, the world has witnessed explosive growth in the demand for wireless communications and it is predicted that this demand will increase in the future. There are already over 500 million users subscribing to cellular telephone services and the number is continually increasing. Eventually, in the not too distant future the number of cellular subscribers will exceed the number of fixed line telephone installations. Already, in may cases, the revenues from mobile services already exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLs).

Currently, the majority of users subscribe to digital cellular networks. Almost all new cellular handsets sold to customers are based on digital technology, typically second generation digital technology. Currently, third generation digital networks are being designed and tested which will be able to support data packet networks and much higher data rates. The first generation analog systems comprise the well known protocols AMPS, TACS, etc. The digital systems comprise GSM, TDMA (IS-136) or CDMA (IS-95), etc.

Most communication systems must combat a problem known as Intersymbol Interference (ISI). Ideally, a transmitted symbol should arrive at the receiver undistorted, possibly attenuated greatly and occupying only its time interval. In reality, however, this is rarely the case and the received symbols are subject to ISI. Intersymbol interference occurs when one symbol is distorted so much that it occupies the time intervals of other symbols.

A diagram illustrating a transmitted symbol spread across multiple symbol times due to the effects of multipath propagation and filtering is shown in FIG. 1. The graph depicts the received channel impulse response. It illustrates the output signal strength of the channel when only one symbol was transmitted. The ticks define symbol duration times T. A symbol transmitted between times 4 to 5 is spread over eight symbol times.

The situation is made even worse in GSM communications systems as the GSM transmitter contributes its own ISI due to controlled and deliberate ISI from the transmitter's partial response modulator. The effects of ISI are influenced by the modulation scheme and the signaling techniques used in the radio.

Considering ISI caused by the radio channel, multipath fading is the primary component. The problem stems from the fact that the transmitted signal takes alternate paths in addition to the direct path. In some cases, there is no direct path because it is blocked. Each path is characterized by a different delay and reflection coefficient. The fading phenomenon is due to interference between many signal reflections each having different phases. Since the carrier frequency is typically very high in radio channels, any change in the propagation channel greatly affects the interference pattern. This is typically observed as fast channel variations over time. It may be characterized through Doppler spread measurements. Doppler spread is caused by the relative motion between a receiver and a transmitter. Signals arrive at the receive having different frequencies, amplitudes and phase. ISI can also be generated when a signal is passed through a filter too narrow to accommodate the bandwidth of the signal, e.g., the transmitter pulse shaping filter or receive filter. A narrow filter spreads the modulation pulses over time and the channel itself has filter like effects on the transmitted signal. With the radio channel, however, the characteristics of its filter like action vary with time.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM systems.

The MLSE technique is a nonlinear equalization technique which is applicable when the radio channel can be modeled as a Finite Impulse Response (FIR) system. Such a FIR system requires knowledge of the channel impulse response tap values. It obtains this information by using a known symbol sequence to estimate the channel impulse response. The known symbol sequences are called training sequences or sounding sequences, which the transmitter sends to the receiver at regular intervals.

There exist other equalization techniques such as Decision Feedback Equalization (DFE) or linear equalization. All these equalization techniques require precise knowledge of the channel.

In GSM, the training sequence is sent in the middle of each burst. As shown in FIG. 2, each fixed length burst 10 consists of 142 symbols preceded by 3 tail symbols 12 and followed by 3 tail symbols 20 and 8.25 guard symbols 22. The 142 symbols include a 58 symbol data portion 14, 26 symbol training sequence 16 and another 58 symbol data portion 18. Since the training sequence is sent in the middle of the burst, it is referred to as a midamble. It is inserted in the middle of the burst in order to minimize the maximum distance to a data bit thus minimizing the time varying effects at the ends of the burst.

The training sequences comprise sequences of symbols generated to yield good autocorrelation properties. The receiver control algorithm uses the training sequence, received in the presence of ISI, to determine the characteristics of the channel that would have generated the symbols actually received. GSM uses eight different training sequences whereby the autocorrelation of each results in a central peak surrounded by zeros. The channel impulse response can be measured by correlating the stored training sequence with the received sequence.

The MLSE equalizer (also called a Viterbi equalizer) uses the Viterbi algorithm along with inputs and an estimate of the channel to extract the data. The equalizer generates a model of the radio transmission channel and uses this model in determining the most likely sequence. An estimate of the transfer function of the channel is required by the MLSE equalizer in order to be able to compensate for the channel ISI effect.

The problem of estimating the channel is made worse by the dynamic nature of the channel. The equalizer must continuously adapt to varying channel characteristics as the mobile station moves through different multipath environments. For this reason, the training sequence is included in each burst.

The MLSE equalizer operates by scanning all possible data sequences that could have been transmitted, computing the corresponding receiver input sequences, comparing them with the actual input sequences received by computing metric parameters and selecting the sequence yielding the highest likelihood of being transmitted. Considering that ISI can be viewed as unintentional coding by the channel, the Viterbi algorithm used in the MLSE equalizer can be effective not only in decoding convolutional code sequences but in combating ISI. Typically, the MLSE equalizer comprises a matched filter (i.e. FIR filter) having N taps coupled to a Viterbi processor. The output of the equalizer is input to the Viterbi processor which finds the most likely data sequence transmitted.

A key constraint of the equalizer, whether the equalization technique is linear, DFE, MLSE or otherwise, is that it must have an accurate estimate of the channel in order to achieve good performance. GSM and other TDMA type communications systems provide for this by transmitting a burst comprising unknown data and a known training sequence. The purpose of the training sequence is to provide a basis for channel estimation. Several methods of channel estimation are known in the art and include, for example, a correlation method and a least squares method.

All the above methods, however, assume a known channel order which, in reality is unknown. Accurate knowledge of the channel order and channel tap coefficients yields optimum performance of the MLSE equalizer. The FIR filter used preferably is long enough to include the channel impulse response (CIR). The number of taps of the filter is important in that it relates to the number of path delays that must be equalized. Note that in the case of GSM, a number of taps N between 5 and 7 typically yields satisfactory results.

Note that the problem of determining the channel order is made worse for radio channels that are characterized by rapidly changing impulse response functions. The taps of the filters used to simulate these channels can be modeled as zero mean, complex, random processes. Thus, the CIR must be measured from burst to burst and cannot be assumed to be fixed.

One possible approach in choosing the number of taps (i.e. the channel order) is to assume a constant channel order. This approach is described in the book "GSM System Engineering," A. Mehrotra, 1997, Chapter 6. This approach, however, has a disadvantage in that when the channel is shorter than the estimated channel length, the noise floor of the receiver increases due to the selection of non-relevant taps. The non-relevant taps result in added noise that is correlated for each symbol since the channel estimate is used in determining each received symbol. Note that although there is always some error in the channel estimate, it is exaggerated when the channel length is estimated to be longer than it actually is.

Another disadvantage is that when the channel is longer than the estimated channel length some channel taps will be omitted when they should not be. In this case, the MLSE equalizer will not be able to eliminate the intersymbol interference completely since the entire channel impulse response is not being modeled.

Other prior art channel estimation techniques involve averaging received training sequence symbols over time. A disadvantage of this technique is that training sequence history must be collected and stored in order to perform channel estimation. This increases the memory resources that are required, since past training sequence symbols must be stored to generate the history.

SUMMARY OF THE INVENTION

Accordingly, the present invention provides a novel and useful apparatus for and method of determining the channel order and channel estimate in a communications system. The present invention is suitable for use with a wide range of channels and is particular useful in estimating wireless channels such as GSM and other types of cellular channels. These types of channels are typically characterized by rapidly changing impulse response and their taps can be modeled as zero-mean, complex, Gaussian random processes. A typically application of the resulting channel order and channel estimate provided by the present invention is with performing maximum likelihood sequence estimation in Viterbi equalizers. Viterbi equalizers are commonly used in both wireless and wired communication systems and are particularly effective at combating ISI in many types of wireless channels such as cellular.

To aid in illustrating the principles of the present invention, the apparatus and method are presented in the context of a GSM mobile station. It is not intended that the scope of the invention be limited to the examples presented herein. One skilled in the art can apply the principles of the present invention to numerous other types of communication systems as well without departing from the scope of the invention.

The method of the present invention is intended to operate with bounded length channels having relatively slowly varying tap delay patterns. Note that in the case of a wireless channel, this equates to a slowly varying pattern of reflectors even though the magnitude and phase of the reflectors may change rapidly. It is noted that each RF path suffers fading and delays independently of each other. The channel estimate taps are related almost one to one with the different paths since they are independent of one another. Thus, the amplitude, phase and delay of the channel must be estimated in order for the equalizer to be able to remove the ISI. In actuality, the delay changes relatively slowly, the amplitude and phase, however, change rapidly.

The operation of the channel order selection scheme of the present invention is based on selecting those taps having a larger energy that the energy of an estimation error. The estimation error is calculated by dividing the complete received training sequence into two different portions, wherein both portions are of equal size. A channel estimate using any suitable well known channel estimation technique is used to calculate the channel estimate of both portions. The two channel estimate results are used to calculate a channel estimation error quantity.

A channel estimate of the entire received training sequence is also performed. Those taps that are then compared to the channel estimate error value previously calculated. Those channel taps that are greater than the channel estimate error value are selected for the final channel estimate model. Those that are not are discarded and are not included in the final model.

Further, the values of the channel taps selected can be refined by recalculating the channel estimate using any suitable channel estimate technique, e.g., least squares method. Once an accurate channel estimate is obtained, the estimate is used by the equalizer in generating the equalized output.

The invention provides the following advantages and benefits. First, the performance of the equalizer, especially a MLSE based one, is enhanced by selecting the appropriate channel order. Second, the invention is well suited for random, zero-mean time varying channels such as wireless channels having blocked line of sight, including cellular, cordless, etc. Third, the invention is well suited for random, non zero-mean time varying channels such as wireless channels with line of sight, including cellular, cordless, etc.

A fourth advantage of the channel order selection scheme of the present invention is that it does not require any historical data. Thus, memory resources are not required for saving histogram data. This aspect of the invention is particularly beneficial in those systems where historical data cannot be stored. For example, in EGPRS systems up to 8 mobile stations may transmit during the same time slot. Therefore, at the Base Station receiver side, information as to which mobile station transmitted in the previous time slot may not be available. In those systems that use historical data in calculating channel estimation, history from different mobile stations will be combined causing signification degradation in performance. A further advantage of not requiring historical data in accordance with the present invention, is that the problem of historical data going stale does not arise. This may occur in prior art systems where too much time passes between received packets thus causing the historical information to become outdated and irrelevant.

There is thus provided in accordance with the present invention a method of channel order selection, the method comprising the steps of first performing channel estimation of order L1 on an entire received training sequence to generate a first channel estimate, generating a first training sequence portion and a second training sequence portion from the received training sequence, second performing channel estimation of order L2 on the first training sequence portion of the received training sequence to generate a second channel estimate, third performing channel estimation of order L3 on the second training sequence portion of the received training sequence to generate a third channel estimate, calculating a channel estimation error as a function of the difference between the second channel estimate and the third channel estimate, selecting channel taps from the first channel estimate that are above a threshold, the threshold generated based on the channel estimation error and wherein L1, L2 and L3 are positive integers.

There is also provided in accordance with the present invention a method of channel order selection, the method comprising the steps of first performing channel estimation on an entire received training sequence to generate a first channel estimate, forming a first training sequence portion and a second training sequence portion from the received training sequence, second performing channel estimation on the first training sequence portion and the second training sequence portion to generate a second channel estimate and a third channel estimate, respectively, calculating an error estimate as a function of the difference between the second channel estimate and the third channel estimate and selecting those channel taps from the first channel estimate that exceed the error estimate.

There is further provided in accordance with the present invention an apparatus for channel order selection comprising means for first performing channel estimation on an entire received training sequence, means for dividing the received training sequence into two non equal training sequence portions of the same size, means for second performing channel estimation on both the training sequence portions, means for calculating a noise floor estimate as a function of the difference between channel estimates performed on both the training sequence portions and means for selecting those channel taps from the channel estimate on the entire received training sequence that exceed the noise floor estimate.

There is also provided in accordance with the present invention a radio receiver comprising a radio frequency (RF) receiver front end circuit for receiving a radio signal transmitted over a channel and downconverting the radio signal to a baseband signal, a demodulator adapted to demodulate the baseband signal in accordance with the modulation scheme used to generate the transmitted radio signal, an equalizer adapted to remove intersymbol interference introduced by the channel in accordance with a channel estimation, a channel estimation module for performing channel order selection comprising signal processing means adapted to calculate a channel estimation of an entire received training sequence to generate a first channel estimate, form a first training sequence portion and a second training sequence portion from the received training sequence, perform channel estimation on the first training sequence portion and the second training sequence portion to generate a second channel estimate and a third channel estimate, respectively, calculate an error estimate as a function of the difference between the second channel estimate and the third channel estimate, select those channel taps from the first channel estimate that exceed the error estimate and a decoder adapted to decode the output of the equalizer to generate output data therefrom.

There is further provided in accordance with the present invention a computer program product for use in a communications receiver, the computer program product comprising a computer useable medium having computer readable program code means embodied in the medium for performing channel order selection, the computer program product comprising computer readable program code means for first performing channel estimation on an entire received training sequence to generate a first channel estimate, computer readable program code means for forming a first training sequence portion and a second training sequence portion from the received training sequence, computer readable program code means for channel estimation on the first training sequence portion and the second training sequence portion to generate a second channel estimate and a third channel estimate, respectively, computer readable program code means for calculating an error estimate as a function of the difference between the second channel estimate and the third channel estimate and computer readable program code means for selecting those channel taps from the first channel estimate that exceed the error estimate.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AMPS | Advanced Mobile Telephone System |
| ASIC | Application Specific Integrated Circuit |
| AWGN | Additive White Gaussian Noise |
| CDMA | Code Division Multiple Access |
| CIR | Channel Impulse Response |
| CPU | Central Processing Unit |
| CRC | Cyclic Redundancy Check |
| DFE | Decision Feedback Equalizer |
| DSL | Digital Subscriber Line |
| DSP | Digital Signal Processor |
| EEROM | Electrically Erasable Read Only Memory |
| EGPRS | Enhanced General Packet Radio System |
| FIR | Finite Impulse Response |
| FPGA | Field Programmable Gate Array |
| GERAN | GSM EDGE Radio Access Network |
| GMSK | Gaussian Minimum Shift Keying |
| GSM | Global System for Mobile Communication |
| ISDN | Integrated Services Digital Network |
| ISI | Intersymbol Interference |
| MLSE | Maximum Likelihood Sequence Estimation |
| PSK | Phase Shift Keying |
| RF | Radio Frequency |
| ROM | Read Only Memory |
| TACS | Total Access Communications Systems |
| TDMA | Time Division Multiple Access |
| VA | Viterbi Algorithm |
| WLAN | Wireless Local Area Network |
| WLL | Wireless Local Loop |

DETAILED DESCRIPTION OF THE INVENTION

The present invention is a method of channel order selection and channel estimation. The method of the present invention is particularly useful in communication systems characterized by dynamically changing channels such as wireless communications systems. Examples of wireless communication systems include cordless telephony and cellular communication systems. Examples of cellular communications systems include global systems for mobile communications (GSM), CDMA, TDMA, etc.

To aid in understanding the principles of the present invention, the method is described in the context of a channel estimation module in a wireless modem intended for use in a GSM or GERAN cellular system. As described in more detail below, the channel estimation module is adapted to calculate channel estimates on blocks of samples using any suitable channel estimation technique such as well known least squares or correlation techniques.

Note that the modem configuration presented herein is intended for illustration purposes only and is not meant to limit the scope of the present invention. It is appreciated that one skilled in the communication signal processing arts can apply the channel estimation method of the present invention to numerous other modem topologies and communication scenarios as well (wireless or not).

Figure 3:
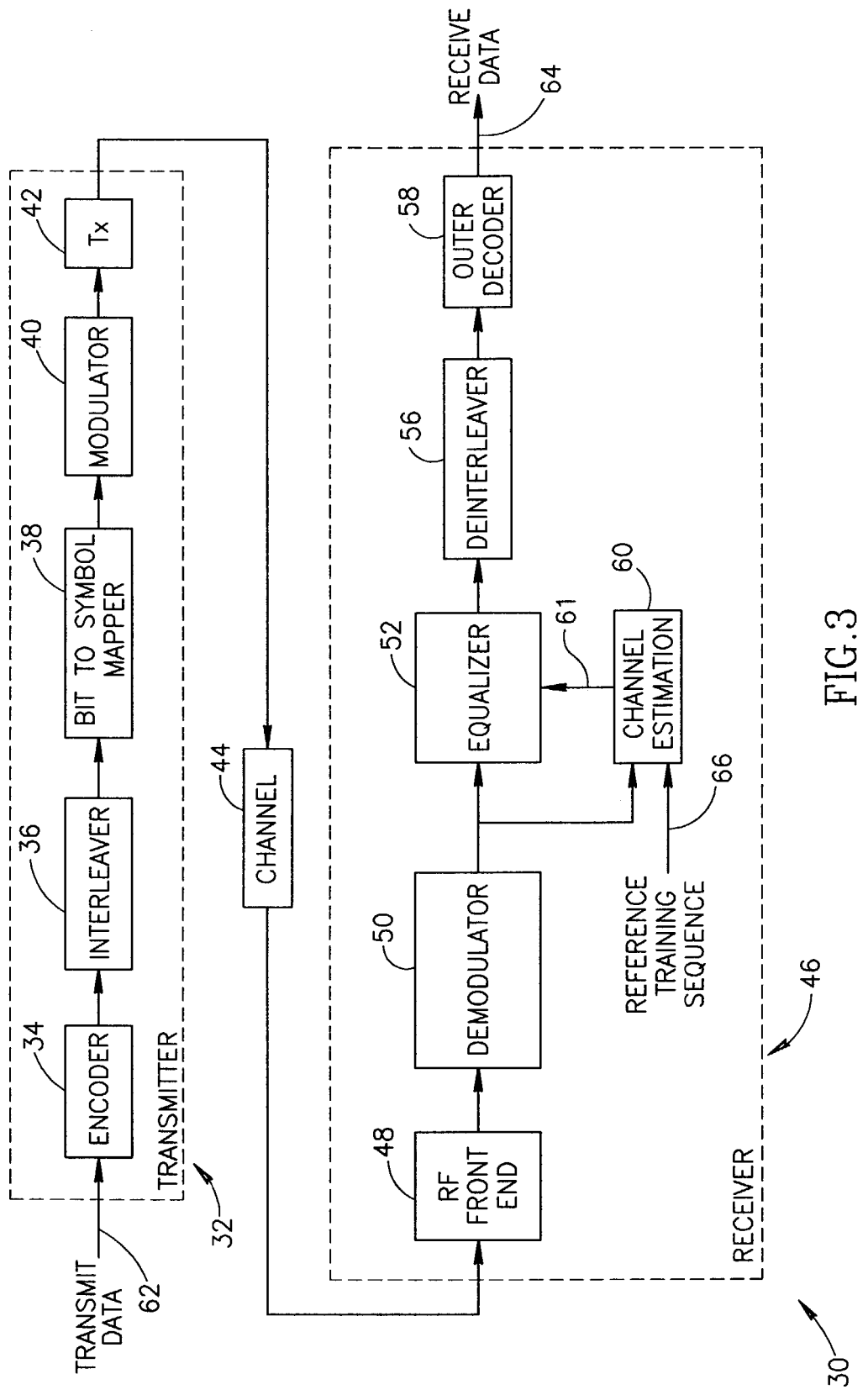
FIG. 3 is a block diagram illustrating the functional processing blocks in a GSM mobile station.

A block diagram illustrating the functional processing blocks in a GSM mobile station is shown in FIG. 3. The communication system, generally referenced 30, comprises a concatenated encoder transmitter 32 and a concatenated decoder receiver 46, both coupled to a channel 44. The transmitter comprises an encoder 34, interleaver 36, bit to symbol mapper 38, modulator 40 and transmit circuit 42.

Input data bits 62 to be transmitted are input to the encoder which may comprise an error correction encoder such as Reed Solomon, convolutional encoder, parity bit generator, etc. The encoder functions to add redundancy bits to enable errors in transmission to be located and fixed.

The bits output of the encoder are then input to the interleaver which functions to rearrange the order of the bits in order to more effectively combat error bursts in the channel. The bits output of the interleaver are then mapped to symbols by the symbol mapper. The bit to symbol mapper functions to transform bits to modulator symbols from an M-ary alphabet. For example, an 8-PSK modulator converts input bits into one of eight symbols. Thus, the mapper in this case generates a symbol for every three input bits.

The symbols output from the mapper are input to the modulator which functions to receive symbols in the M-ary alphabet and to generate an analog signal therefrom. The transmit circuit filters and amplifies this signal before transmitting it over the channel. The transmit circuit comprises coupling circuitry required to optimally interface the signal to the channel medium.

The channel may comprise a mobile wireless channel, e.g., cellular, cordless, fixed wireless channel, e.g., satellite, or may comprise a wired channel, e.g., xDSL, ISDN, Ethernet, etc. It is assumed that AWGN is present which is added to the signal in the channel. The transmitter is adapted to generate a signal that can be transmitted over the channel so as to provide robust, error free detection by the receiver.

It is noted that both the inner and outer decoders in the receiver have complimentary encoders in the system. The outer encoder in the system comprises the encoder 34, e.g., convolutional, etc. The inner encoder comprises the channel itself, which in one embodiment can be modeled as an L-symbol long FIR-type channel.

At the receiver, the analog signal from the channel is input to RF front end circuitry 48 which demodulates and samples the received signal to generate received samples at the symbol rate. Assuming a receiver adapted to receive a GSM signal, the samples comprising a complete burst are collected and subsequently split into training sequence samples and data samples. The data samples are input to the equalizer 52 while the training sequence samples are input to a channel estimation module 60 which functions to calculate a channel estimate 61. The channel estimate is generated using the received training sequence samples and the known training sequence 66.

Several methods of channel estimation that are known in the art and suitable for use with the present invention include, for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998, pages 631–636. The least square method of channel estimation is described in more detail in the articles "Improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

The inner decoder (i.e. the equalizer) is operative to generate decisions from the data samples. An example of an inner decoder is an equalizer which compensates for the ISI caused by the delay and time spreading of the channel. The function of the equalizer is to attempt to detect the symbols that were originally transmitted by the modulator. The equalizer is adapted to output symbol decisions and may comprise, for example the well known maximum likelihood sequence estimation (MLSE) based equalizer that utilizes the well known Viterbi Algorithm (VA), linear equalizer or decision feedback equalizer (DFE).

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM and GERAN systems.

The MLSE technique is a nonlinear equalization technique which is applicable when the radio channel can be modeled as a Finite Impulse Response (FIR) system. Such a FIR system requires knowledge of the channel impulse response tap values. As described supra, the channel estimate is obtained using a known training symbol sequence to estimate the channel impulse response. Other equalization techniques such as DFE or linear equalization require precise knowledge of channel.

The channel estimate 61 is used by the equalizer in processing the data blocks on either side of the training sequence midamble. A tracking module may be used to improve the performance of the receiver. If a tracking module is employed, the equalizer is operative to use the initial channel estimate in generating hard decisions for the first block of data samples. Decisions for subsequent data blocks are generated using updated channel estimates provided by the tracking module. The equalizer is also operative to generate preliminary decisions which are used by the tracking module in computing the recursive equations for the updated channel estimate.

The output of the equalizer is input to a de-interleaver 56 which is operative to reconstruct the original order of the data input to the transmitter. The de-interleaved values are subsequently input to the outer decoder 58.

The outer decoder functions to detect and correct errors using the redundancy bits inserted by the encoder in the transmitter and to generate the receive data 64. Examples of the outer decoder include convolutional decoders utilizing the Viterbi Algorithm, etc.

Channel Order Selection Method

Figure 4:
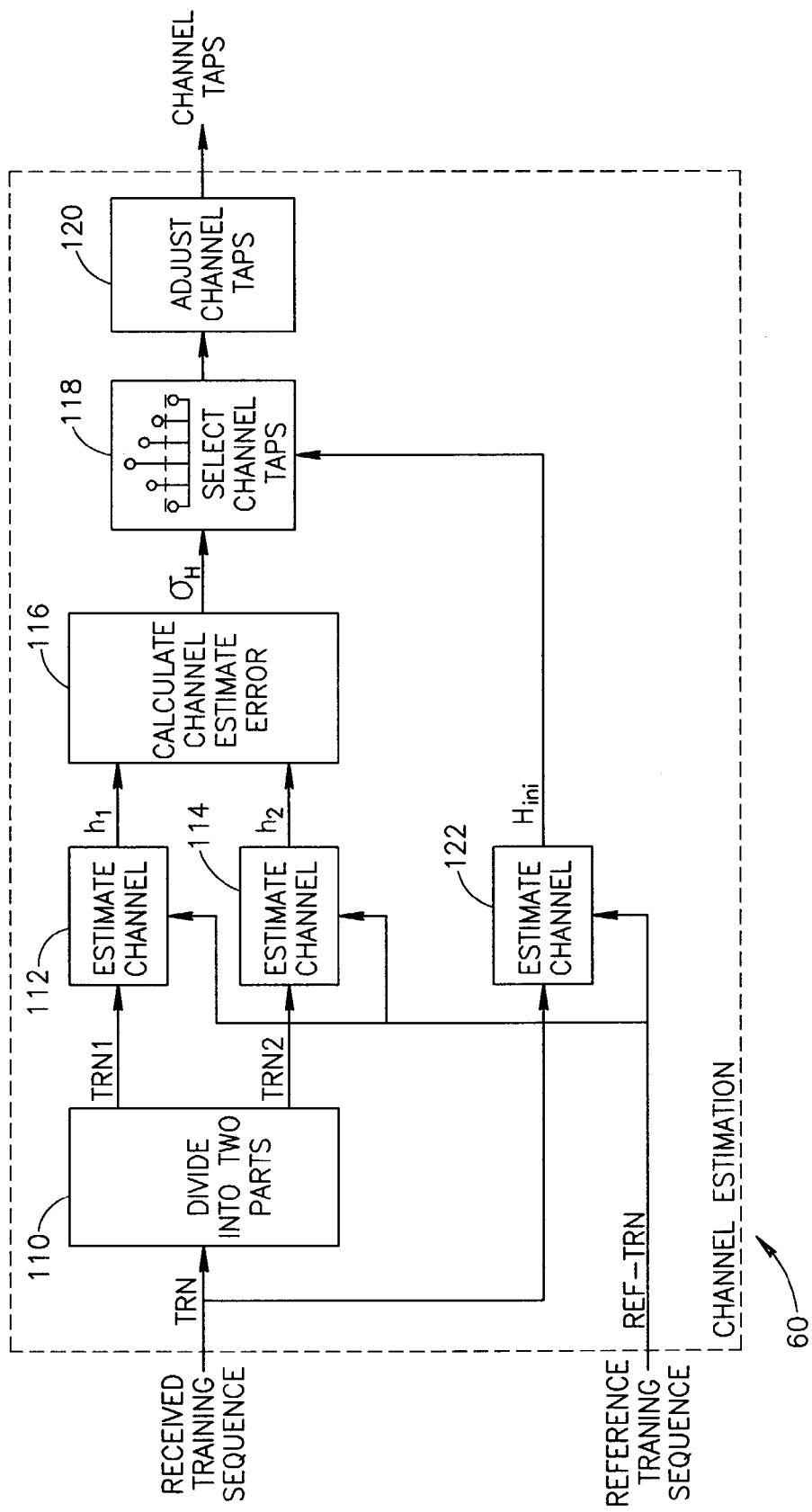
FIG. 4 is a block diagram illustrating a channel estimation block constructed in accordance with the present invention in more detail.

A block diagram illustrating a channel estimation block constructed in accordance with the present invention in more detail is shown in FIG. 4. The channel order selection method is preferably implemented in the channel estimation module 60 (FIG. 3). Note, however, that the channel order selection method and apparatus of the present invention is not limited to the example present herein and may be implemented by one skilled in the signal processing arts to other types of communication systems (wired or wireless). In addition, the method and apparatus presented herein may be implemented using any suitable technique known in the art such as (1) software or firmware adapted to execute on a digital signal processor (DSP), (2) software or firmware adapted to execute on a general purpose microprocessor or CPU or (3) as hardware circuitry on an ASIC, FPGA, custom integrated circuit, etc.

In accordance with the GSM example presented herein, a known training sequence is transmitted over a channel with unknown ISI length. Let us define this channel as a vector $H=\lfloor H_0 H_1 \ldots H_{N-1} \rfloor$. The goal is to define which of the N channel taps are to be included in the final channel estimation. Let us define the maximal possible channel length as L ($L \leq N$). In an initial model, we select more then L taps because enough taps have to be included for every possible channel delay that may exist. For example, for a channel with zero delay we will select $H_0$ as a first tap and for a channel with a one tap delay we will select $H_1$ as a first tap. Thus, a maximum of L taps will be selected from H. This means that if the first chosen tap index is I then the last tap index shall be less or equal to i+L−1. Thus, the goal is to find the index i of the first tap and index i+I−1 of the last tap where I is the estimated channel length.

The initial channel estimation estimated from the received training sequence will be H and will have length N. We find L consecutive taps, for example, having the highest energy with a first tap at k as given below $$\max_k \left( \sum_{m=k}^{m=k+L-1} H_m^2 \right) \qquad (1)$$

It is thus assumed that the channel taps can be found only within the L consecutive taps having the highest energy. Note that it is assumed that the received training sequence length is longer then N. Note also that in some cases, the delay is known eliminating the requirement to find the L taps having the highest energy because L=N and k=0.

To aid in understanding the present invention, the channel is defined different as above. In particular, the channel is defined as a vector $$H=\lfloor H_0 H_1 \ldots H_{L-1} \rfloor \qquad (2)$$

The received training sequence is defined as TRN while the reference training sequence is defined as REF-TRN.

With reference to FIG. 4, the channel estimation module 60 comprises a divider block 110, channel estimate blocks 112, 114, 122, channel estimate error block 116, channel selection block 118 and an optional channel tap adjustment block 120.

A channel estimate of length L is calculated from TRN via channel estimate block 122 and denoted $H_{ini}$. The channel estimates performed by blocks 112, 114 and 122 may be accomplished using any well known channel estimation technique including, for example, those based on Least Squares or Correlation techniques as referenced hereinabove.

The received training sequence TRN is divided via divide block 110 into two separate portions denoted TRN1 and TRN2. For example, in the case of GSM, the training sequence of 26 symbols is divided into two portions each 13 symbols. The first portion comprises symbols 1 to 13 and the second portion comprises symbols 14 to 26. Note that although the two divided portions are different they may have a number of overlapping symbols. For example, the first portion may comprise symbols 1 to 15 and the second portion comprises symbols 12 to 26 thus having an overlap of 4 symbols between the two portions. In all cases, the method works best when both portions have an equal number of symbols.

The length of divided portion TRN1 is equal to the length of divided portion TRN2 and is defined as TN. It is noted that in order to perform channel estimation of order L on each portion TRN1 and TRN2, we need TN>L.

Channel estimation of order L is then performed on TRN1 using any suitable well known channel estimation technique via channel estimate block 112. The channel estimate generated is denoted $$h_1 = [h_{1_0} h_{1_1} \ldots h_{1_{L-1}}] \quad (3)$$

Similarly, channel estimation of order L is performed on TRN2 using any suitable well known channel estimation technique via channel estimate block 114. The channel estimate generated is denoted $$h_2 = [h_{2_0} h_{2_1} \ldots h_{2_{L-1}}] \quad (4)$$

Next, an estimate of the channel estimation error $\sigma_H$ is calculated via the channel estimation error block 116. Let us define for the case where the estimates on both portions are of equal size (in other cases, care must be taken to find the appropriate estimation error vector):

$$h_{err} = [(h_{1_0} - h_{2_0}) (h_{1_1} - h_{2_1}) \ldots (h_{1_{L-1}} - h_{2_{L-1}})] \quad (5)$$

The channel estimation error is denoted $\sigma_H$ and is given by $$\sigma_H^2 = \frac{1}{L} \sum_0^{L-1} |h_{err}|^2 \quad (6)$$

Given that there are L taps of $H_{ini}$ we need to estimate which taps should be included in the final model of the channel estimation. The selection of which channel taps to include in the final model is performed by the channel tap selection block 118. The selection is performed in accordance with the following pseudo code listing.

Listing 1: Channel Tap Selection

```
For i=0 to i=L-1
    If |Hini_i|² > A·σ_H²
        Then there is a tap at the i^th location
    Else no tap at i^th location
    End If
End For
```

Note that in Listing 1 above, A is an empirically chosen constant (i.e. correction factor) which can be chosen in any suitable manner such as in accordance with simulation results. For example, the value of A may be varied while tracking the corresponding change in results. The value of A corresponding to the optimum results obtained is used in the selection of the channel taps.

Thus, the invention is operative to select those channel taps from $H_{ini}$ whose value is greater than the variance of the estimated error $\sigma_H$ multiplied by a constant.

It is important to point out that the present invention is not limited to the embodiments described above. In particular, the channel order length L of the channel estimates performed on the entire training sequence and the two training sequence portions do not necessarily have to be of the same length. All three may be of different lengths. It is preferable, however, that the channel order length of the channel estimates performed on the two training sequence portions be equal in order to achieve maximum performance.

In addition, the size of the training sequence portions is not limited to two equal sized portions. Alternatively, the two training sequence portions may be of non-equal size. It is preferred, however, that the size of the two portions be the same in order to maximize performance. The invention is operable using non-equal size training sequence portions but, in this case, yields some performance degradation.

Further, the techniques used to perform the channel estimates on the entire training sequence and the two portions do not necessarily have to be the same. All three channel estimates may utilize different channel estimation techniques. It is preferable, however, that the channel estimates performed on the two training sequence portions utilize the same techniques and methods.

As an option, the channel estimation obtained can be further refined to have fewer taps that the number found using the algorithm in Listing 1. As described above, N and L were defined whereby L is the maximum channel order wherein we first need to choose L taps from N taps of the channel before proceeding. At the output of block 118, the I taps of the final model have been chosen. We can, however, redefine N=L=I and repeat the channel selection process again using these new parameters. During the next iteration, I can only be reduced thus providing an improvement when some taps, which should have been excluded, were included in the previous iteration. The iterative process ceases when I remains the same as it was in the previous iteration. Note, however, that these iterations are optional since the improvement in performance may be marginal while the complexity of implementation is increased as the number of iterations is increased.

Performing the iterations provides an improvement by tightening the bounds before each subsequent iteration. The bounds being the maximum possible channel length which is the input to next iteration of the algorithm. Performing channel estimation on the same number of input samples is more accurate when some of incorrect taps are removed. Thus, statistically, $H_{ini}$ will be more accurate on the one hand, while the noise floor ($A \cdot \sigma_H^2$) will be lower on the other hand ($h_1$, $h_2$ less taps yields higher accuracy). Thus, in the iteration, for some tap i to be removed $H_{ini}(i)$ should be smaller than the noise floor from the new iteration. We therefore have $H_{ini}(i)$ from the previous iteration being larger than the noise floor from the previous iteration while $H_{ini}(i)$ from the new iteration is smaller than the noise floor from the new iteration. The noise floor from the previous iteration is bigger than the noise floor from new iteration, thus $H_{ini}(i)$ from the previous iteration is bigger than the noise floor of the new iteration as well. According to $H_{ini}(i)$ from the previous iteration we should select tap i, and according to the new iteration we should remove it, but $H_{ini}(i)$ from the new iteration is more accurate so it is better to make a selection based on a decision using $H_{ini}(i)$ from the new iteration.

Figure 5:
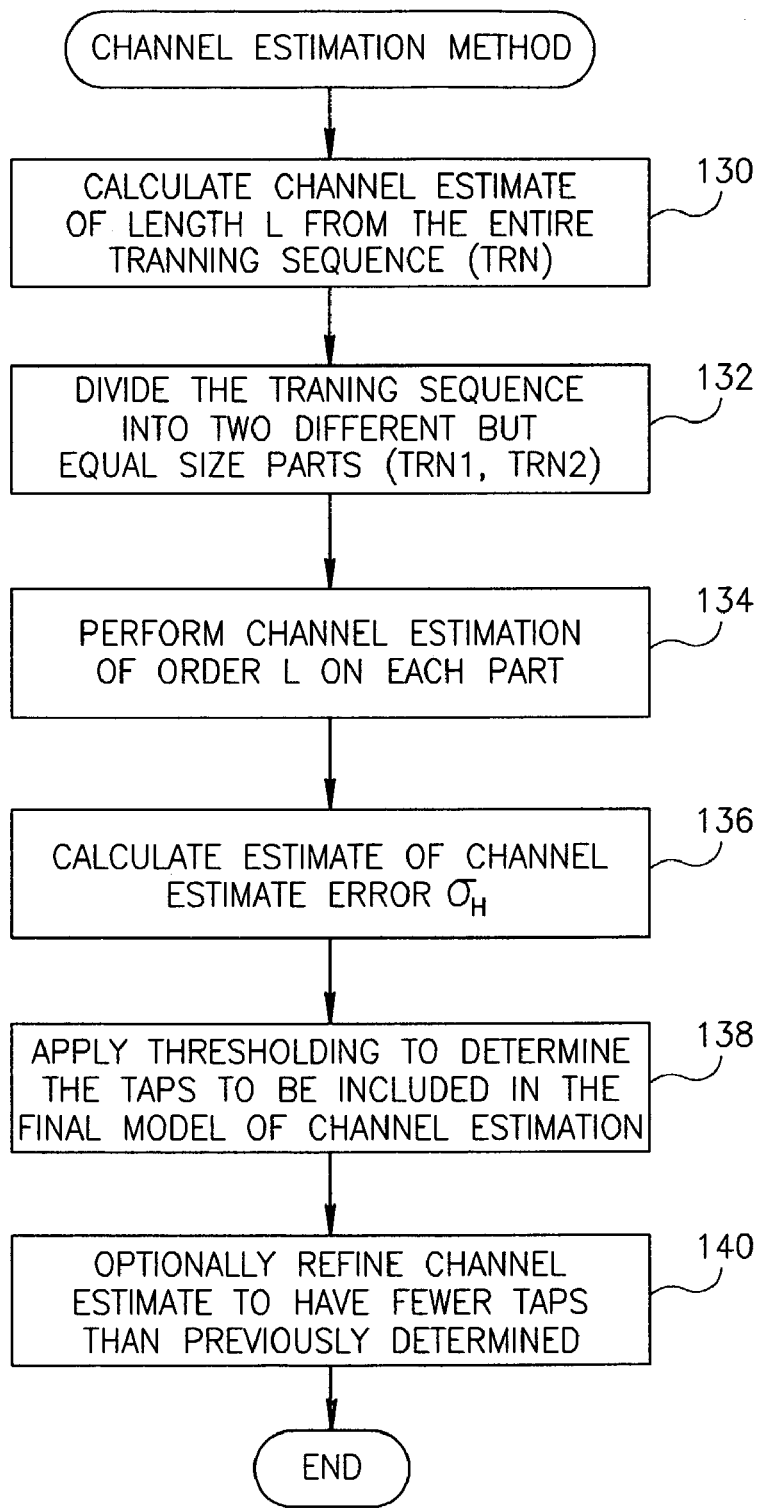
FIG. 5 is a flow diagram illustrating the channel estimation method of the present invention.

A flow diagram illustrating the channel estimation method of the present invention is shown in FIG. 5. This flow diagram corresponds to the functional block diagram presented in FIG. 4 described supra. A channel estimate of length L is calculated from the entire length of the received training sequence TRN, and is denoted by $H_{ini}$ (step 130). The received training sequence is divided into two separate portions each having an equal number of symbols (step 132). The first portion is denoted TRN1 and the second portion is denoted TRN2.

Channel estimation of order L is then performed on each portion (step 134). An estimate of the channel estimation error $\sigma_H$ is then calculated (step 136). Thresholding is then applied to the channel estimate $H_{ini}$ of the entire received training sequence to determine the taps to be included in the final model of the channel estimate (step 138). The resultant channel estimate is then optionally refined to have fewer taps than determined (step 140).

A description of the rationale for the channel order selection method and apparatus described supra will now be presented. In accordance with the scheme presented above, the channel estimates of $h_1$ and $h_2$ are estimated on different portions of the received training sequence (i.e. TRN1 and TRN2). It can be assumed, however, that the channel does not significantly change between those portions. It can thus be written $$h_1 = H_r + n_1 \quad h_2 = H_r + n_2 \quad (7)$$

wherein $H_r$ denotes a vector of actual channel taps without noise.

$n_1$ denotes the noise of first channel estimation.

$n_2$ denotes the noise of second channel estimation.

then $h_{err}$ can be expressed as $$h_{err} = H_r - H_r + n_1 - n_2 = n_1 - n_2 \quad (8)$$

Further, since $h_1$ and $h_2$ were taken from different parts of the received training sequence it can be assumed that the correlation between $n_1$ and $n_2$ is close to zero. Therefore, the following holds $$\sigma_H^2 \approx E(n_1 - n_2)^2 = E(n_1^2) + E(n_2^2) - 2E(n_1 n_2) \approx E(n_1^2) + E(n_2^2) \quad (9)$$

Since $h_1$ and $h_2$ were estimated from the vectors of the received training sequence portions having the same length $$E(n_1^2) = E(n_2^2) \quad (10)$$

and $$\sigma_H^2 \approx 2 E(n_1^2) \quad (11)$$

Since $h_1$ and $h_2$ were estimated from two vectors which are shorter then the vector of the entire training sequence TRN, an additional constant A is introduced to compensate for the difference of the length between the vectors from which $h_1$ and $h_2$ were estimated and the vector from which $H_{ini}$ was estimated.

Thus, $\sigma_H^2$ is the estimated variance of error of channel estimation. This is the reason why the estimated channel taps having a value larger than the estimated error are not selected in the final model thereby significantly improving the overall results of the receiver.

The invention provides the following advantages and benefits. First, the performance of the equalizer, especially a MLSE based one, is enhanced by selecting the appropriate channel order. Second, the invention is well suited for random, zero-mean time varying channels such as wireless channels having blocked line of sight, including cellular, cordless, etc. Third, the invention is well suited for random, non zero-mean time varying channels such as wireless channels with line of sight, including cellular, cordless, etc.

A fourth advantage of the channel order selection scheme of the present invention is that it does not require any historical data. Thus, memory resources are not required for saving histogram data. This aspect of the invention is particularly beneficial in those systems where historical data cannot be stored. For example, in EGPRS systems up to 8 mobile stations may transmit during the same time slot. Therefore, at the Base Station receiver side, information as to which mobile station transmitted in the previous time slot may not be available. In those systems that use historical data in calculating channel estimation, history from different mobile stations will be combined causing signification degradation in performance. A further advantage of not requiring historical data in accordance with the present invention, is that the problem of historical data going stale does not arise. This may occur in prior art systems where too much time passes between received packets thus causing the historical information to become outdated and irrelevant.

GSM EDGE Embodiment

Figure 6:
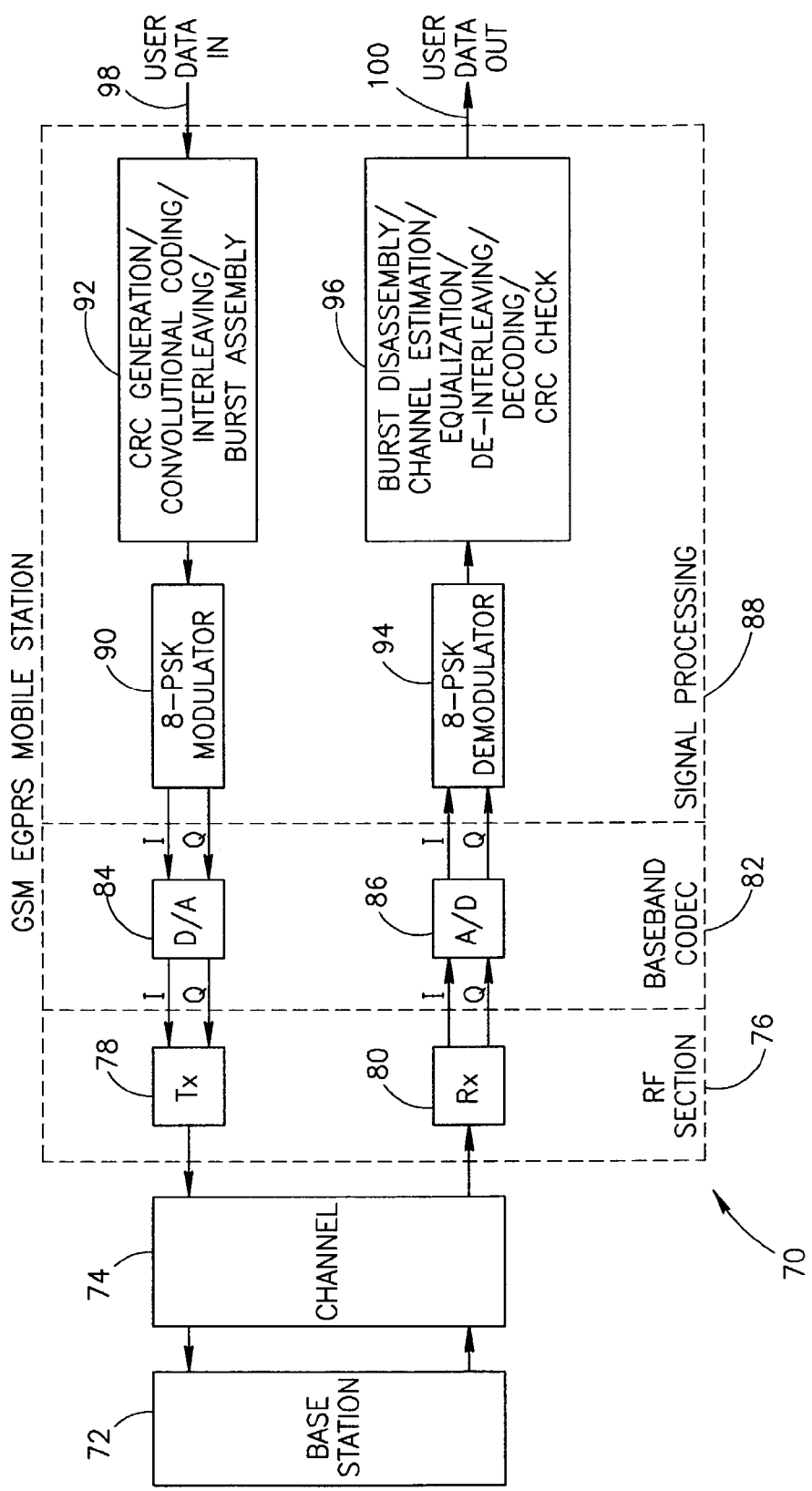
FIG. 6 is a block diagram illustrating the processing blocks of a GSM EGPRS mobile station in more detail including RF, baseband and signal processing blocks.

A GSM EGPRS mobile station constructed to comprise means for performing the channel tracking method of the present invention is presented. A block diagram illustrating the processing blocks of a GSM EGPRS mobile station in more detail including RF, baseband and signal processing blocks is shown in FIG. 6. The radio station is designed to provide reliable data communications at rates of up to 470 kbit/s. The GSM EGPRS mobile station, generally referenced 70, comprises a transmitter and receiver divided into the following sections: signal processing circuitry 88, baseband codec 82 and RF circuitry section 76.

In the transmit direction, the signal processing portion functions to protect the data so as to provide reliable communications from the transmitter to the base station 72 over the channel 74. Several processes performed by the channel coding block 92 are used to protect the user data 98 including cyclic redundancy code (CRC) check, convolutional coding, interleaving and burst assembly. The resultant data is assembled into bursts whereby guard and trail symbols are added in addition to a training sequence midamble that is added to the middle of the burst. Note that both the user data and the signaling information go through similar processing. The assembled burst is then modulated by a modulator 96 which may be implemented as a $3\pi/8$ offset 8-PSK modulator.

In the receive direction, the output of the baseband codec is demodulated using a complementary 8-PSK demodulator 94. Several processes performed by the channel decoding block 96 in the signal processing section are then applied to the demodulated output. The processes performed include burst disassembly, channel estimation in accordance with the present invention as described in detail hereinabove, equalization, de-interleaving, convolutional decoding and CRC check. Optionally, soft symbol generation and soft symbol to soft bit conversion may also be performed depending on the particular implementation.

The baseband codec converts the transmit and receive data into analog and digital signals, respectively, via D/A converter 84 and A/D converter 86. The transmit D/A converter provides analog baseband I and Q signals to the transmitter 78 in the RF circuitry section. The I and Q signals are used to modulate the carrier for transmission over the channel.

In the receive direction, the signal transmitted by the base station over the channel is received by the receiver circuitry 80. The analog signals I and Q output from the receiver are converted back into a digital data stream via the A/D converter. This I and Q digital data stream is filtered and demodulated by the 8-PSK demodulator before being input to the channel decoding block 96. Several processes performed by signal processing block are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the channel order selection scheme of the present invention, simulation results are presented and compared for a reference prior art based GSM Enhanced General Packet Radio System (EGPRS) versus an EGPRS system constructed incorporating the channel order selection scheme of the present invention.

The reference simulation is described below. We begin with a known training sequence transmitted over a channel having an unknown ISI length. Let us define this channel as a vector $H=\lfloor H_0 H_1 \ldots H_{N-1} \rfloor$. Let us further define a maximal possible channel length as L. The initial channel estimation estimated from the training sequence will be H and will have a length N. We find L consecutive taps, for example, with the highest energy with the first tap at $$k = \max_k \left( \sum_{m=k}^{m=k+L-1} H_m^2 \right) \quad (12)$$

The L taps determined using Equation 12 above are taken as a final channel estimation of order L. Note that different values for L have been tested since the L that yields better results may be selected for the reference simulation.

The simulations were performed using a software-based modem assuming the MCS5 coding scheme. The results of the simulation were compared using block error rate (BLER) as the criteria. The simulation was performed using three different scenarios: (1) static channel, (2) mobile unit moving at a velocity of 50 km/h in an urban area environment, referred to as TU50, and (3) mobile unit moving at a velocity of 100 km/h in hilly terrain environment, referred to as HT100. Static channel refers to the case where there is no channel and in this channel simulation any ISI is due only to the transmit and receive channel.

For the static channel condition optimum simulation is achieved by choosing L=3. For a TU50 channel condition optimum simulation is achieved by choosing L=5. For a HT100 channel condition optimum simulation is achieved by choosing L=7. Choosing L to optimize one particular channel type, typically degrades performance for others. For example, choosing L to optimize simulation for a static channel causes performance reductions for TU50 and HT100 channels. Since it cannot be predicted which channel type will be present in the next transmission, a single value of L must be chosen for all channels.

Figure 1:
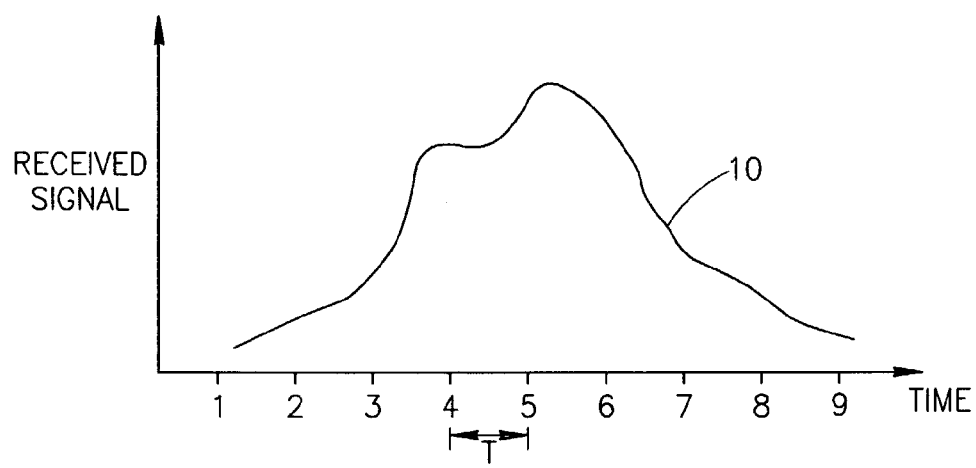
FIG. 1 is a diagram illustrating a transmitted symbol spread across multiple symbol times due to the effects of intersymbol interference (ISI)
Figure 2:
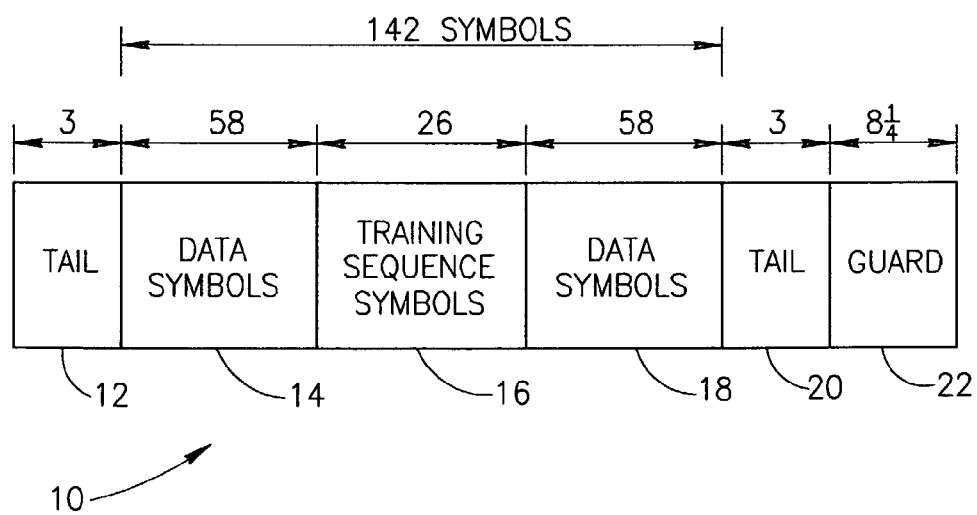
FIG. 2 is a diagram illustrating the structure of a GSM message including tail, data and training symbols.

The EGPRS system is a Time Division Multiple Access (TDMA) system wherein eight users are able to share the same carrier frequency. In an EGPRS transmitter, the data bits are encoded with a rate ⅓ convolutional encoder, interleaved and mapped to 8-ary symbols. The resultant coded data symbols together with the training sequence are assembled into a burst of 142 symbols as shown in FIG. 2.

The burst is then modulated using 3π/8-offset 8-PSK with Gaussian pulse shaping in accordance with the GSM standard. The modulated output is transmitted over a frequency selective Gaussian fading channel as described above. An MLSE type equalizer with a Least Squares type channel estimator was used in the receiver.

Figure 7:
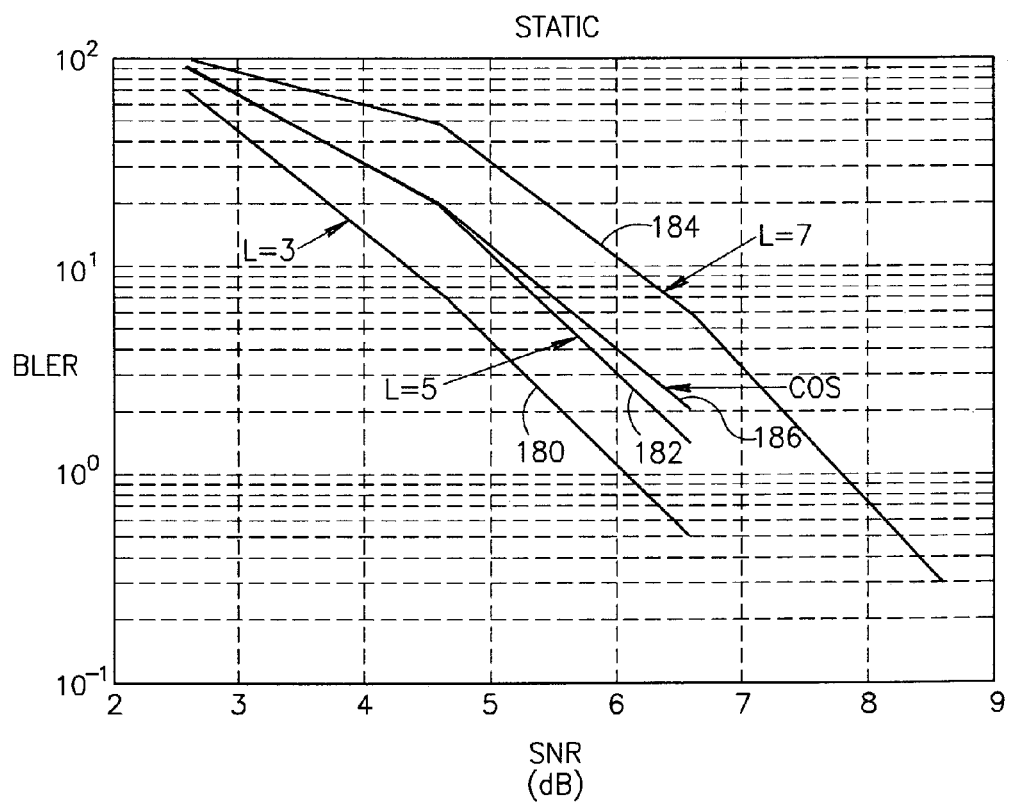
FIG. 7 is a graph illustrating BLER versus SNR simulation results for a static channel of varying lengths for a reference system versus a system incorporating the channel order selection scheme of the present invention.

A graph illustrating BLER versus SNR simulation results for a static channel of varying lengths for a reference system versus a system incorporating the channel order selection scheme of the present invention is shown in FIG. 7. The trace referenced 180 represents the BLER versus SNR for the reference simulation using a channel length L=3. The trace referenced 182 represents the BLER versus SNR for the reference simulation using a channel length L=5. The trace referenced 184 represents the BLER versus SNR for the reference simulation using a channel length L=7. The trace referenced 186 represents the BLER versus SNR for a channel length selected in accordance with the channel order selection scheme of the present invention. As can be seen from the graph in FIG. 7, the channel order selection scheme of the present invention yields a slight degradation of approximately 0.5 dB for the static channel case compared to results obtained with channel length L=3.

Figure 8:
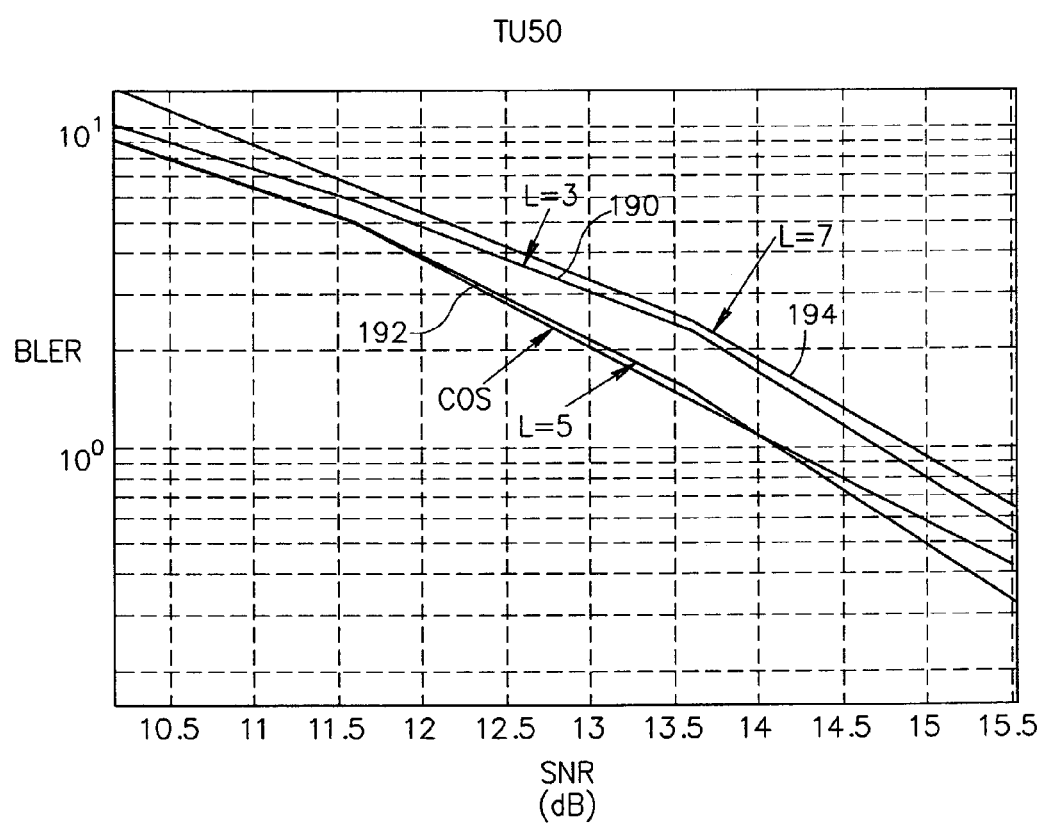
FIG. 8 is a graph illustrating BLER versus SNR simulation results for a TU50 channel of varying lengths for a reference system versus a system incorporating the channel order selection scheme of the present invention.

A graph illustrating BLER versus SNR simulation results for a TU50 channel of varying lengths for a reference system versus a system incorporating the channel order selection scheme of the present invention is shown in FIG. 8. The trace referenced 190 represents the BLER versus SNR for the reference simulation using a channel length L=3. The trace referenced 192 represents the BLER versus SNR for the reference simulation using a channel length L=5. The trace referenced 194 represents the BLER versus SNR for the reference simulation using a channel length L=7. The trace referenced 196 represents the BLER versus SNR for a channel length selected in accordance with the channel order selection scheme of the present invention. As can be seen from the graph in FIG. 8, the channel order selection scheme of the present invention yields substantially the same performance for the TU50 channel case as compared to results obtained with channel length L=5.

Figure 9:
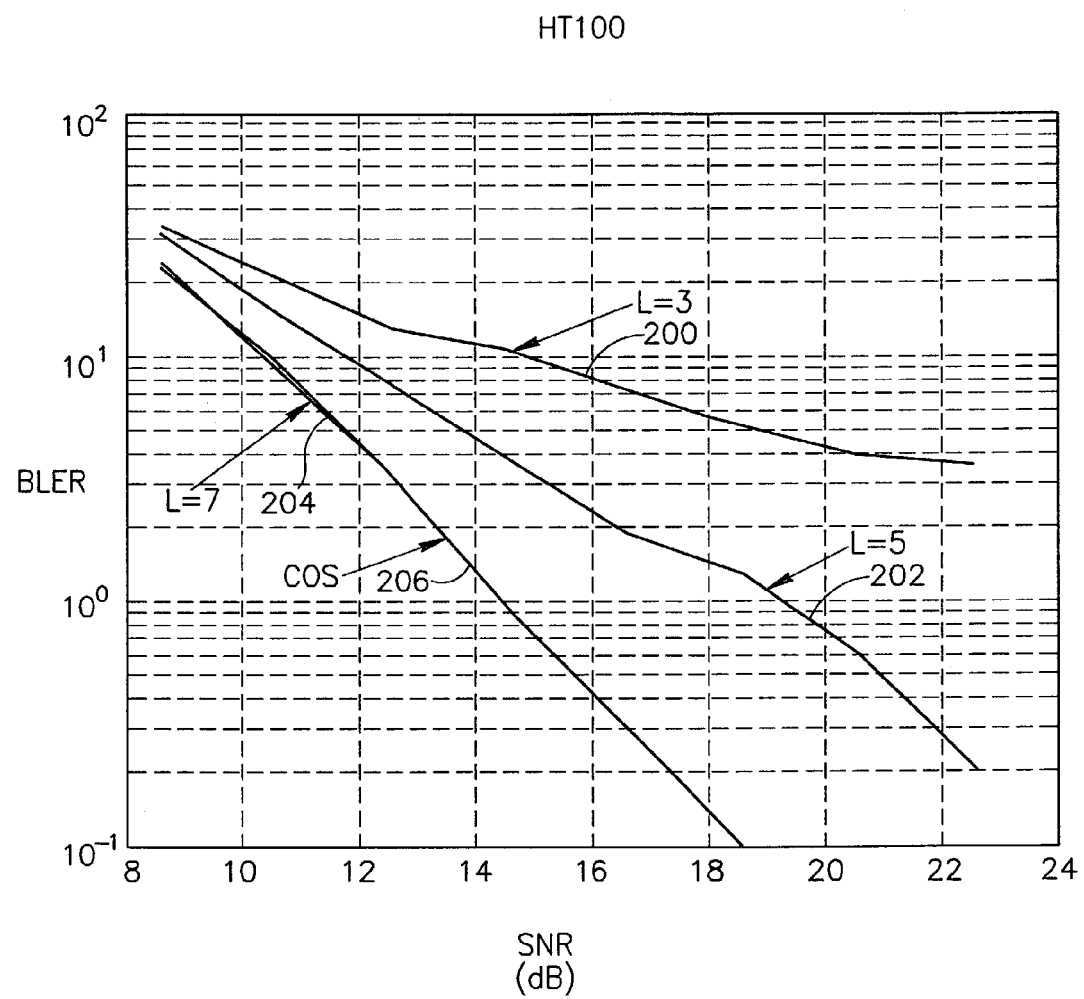
FIG. 9 is a graph illustrating BLER versus SNR simulation results for a HT100 channel of varying lengths for a reference system versus a system incorporating the channel order selection scheme of the present invention.
Figure 10:
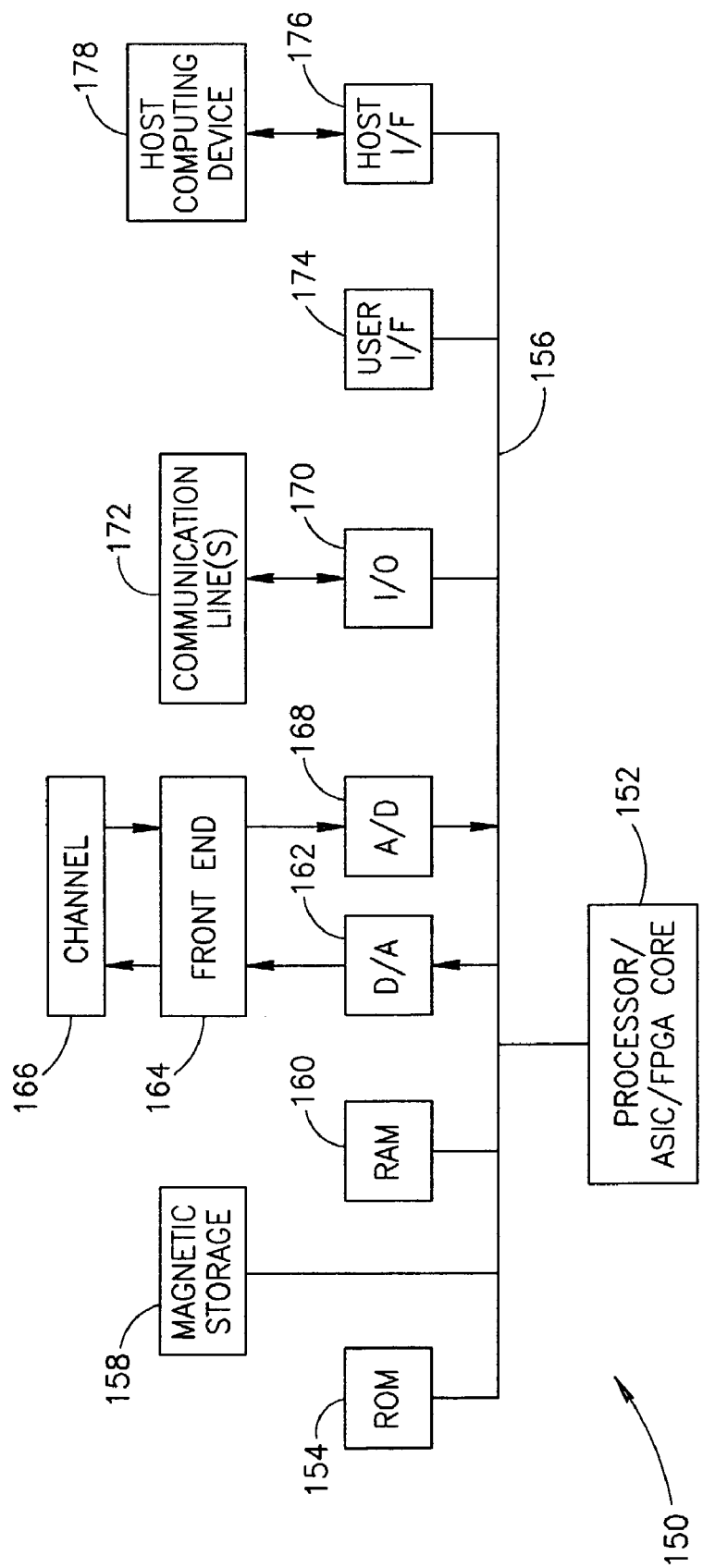
FIG. 10 is a block diagram illustrating an example computer processing system adapted to perform the channel order selection method of the present invention.

A graph illustrating BLER versus SNR simulation results for a HT100 channel of varying lengths for a reference system versus a system incorporating the channel order selection scheme of the present invention is shown in FIG. 9. The trace referenced 190 represents the BLER versus SNR for the reference simulation using a channel length L=3. The trace referenced 192 represents the BLER versus SNR for the reference simulation using a channel length L=5. The trace referenced 194 represents the BLER versus SNR for the reference simulation using a channel length L=7. The trace referenced 196 represents the BLER versus SNR for a channel length selected in accordance with the channel order selection scheme of the present invention. As can be seen from the graph in FIG. 8, the channel order selection scheme of the present invention yields substantially the same performance for the HT100 channel case as compared to results obtained with a channel length L=7.

The improvement obtained using the channel order selection scheme of the present invention for several values of L for each of the three channel types of static, TU50 and HT100, is presented below in Tables 1 through 3.

TABLE 1

Invention improvements using L = 3 for the reference simulation

| Channel Type | Invention improvement over reference simulation |
| --- | --- |
| Static | −0.5 dB |
| TU50 | 0.7 dB |
| HT100 | 10 dB |

TABLE 2

Invention improvements using L = 5 for the reference simulation

| Channel Case | Invention improvement over reference simulation |
| --- | --- |
| Static | 0 dB |
| TU50 | 0 dB |
| HT100 | 5 dB |

TABLE 3

Invention improvements using L = 7 for the reference simulation

| Channel Case | Invention improvement over reference simulation |
| --- | --- |
| Static | 0.9 dB |
| TU50 | 0.9 dB |
| HT100 | 0 dB |

As can be seen from the above tables, the performance varies with the type of channel. In all but one case, the present invention provided the same or improved performance over the prior art. For the static channel type, performance was slightly better without the invention only for channel order L=3. Results improved for higher channel orders of 5 and 7. For the TU50 channel type, an improvement of 0.9 dB was achieved over the fixed channel order of L=7. For the HT100 channel type, an improvement of 10 dB was achieved for the channel order of size L=3.

Without the benefit of the present invention and if the channel order is known beforehand, the tables above can be used to select the optimum channel order size for a particular channel type. This is difficult to do in practice since the characteristics of the channel (in type and length) will invariably change over time making any initial selection short lived. Using the present invention, however, no channel selection is required since the channel estimation scheme is operative to estimate the channel order and corresponding channel taps.

Computer Embodiment

In alternative embodiments, the present invention may be applicable to implementations of the invention in integrated circuits or chip sets, wired or wireless implementations, switching system products and transmission system products. For example, a computer is operative to execute software adapted to implement the channel order selection scheme of the present invention. A block diagram illustrating an example computer processing system adapted to implement the channel order selection scheme of the present invention is shown in FIG. 7. The system may be incorporated within a communications device such as a receiver or transceiver, some or all of which may be implemented in software.

The computer system, generally referenced 150, comprises a processor 152 which may include a digital signal processor (DSP), central processing unit (CPU), microcontroller, microprocessor, microcomputer or ASIC core. The system also comprises static read only memory 154 and dynamic main memory 160 all in communication with the processor. The processor is also in communication, via a bus 156, with a number of peripheral devices that are also included in the computer system.

In the receive direction, signals received over the channel 166 are first input to the RF front end circuitry 164 which comprises a receiver section (not shown) and a transmitter section (not shown). Baseband samples of the received signal are generated by the A/D converter 168 and read by the processor. Baseband samples generated by the processor are converted to analog by D/A converter 162 before being input to the transmitter for transmission over the channel via the RF front end.

One or more communication lines 172 are connected to the system via I/O interface 170. A user interface 174 responds to user inputs and provides feedback and other status information. A host interface 176 connects a host device 178 to the system. The host is adapted to configure, control and maintain the operation of the system. The system also comprises magnetic storage device 158 for storing application programs and data. The system comprises computer readable storage medium that may include any suitable memory means, including but not limited to, magnetic storage, optical storage, semiconductor volatile or non-volatile memory, biological memory devices, or any other memory storage device.

The channel order selection software is adapted to reside on a computer readable medium, such as a magnetic disk within a disk drive unit. Alternatively, the computer readable medium may comprise a floppy disk, removable hard disk, Flash memory card, EEROM based memory, bubble memory storage, ROM storage, etc. The software adapted to implement the channel order selection scheme of the present invention may also reside, in whole or in part, in the static or dynamic main memories or in firmware within the processor of the computer system (i.e. within microcontroller, microprocessor or microcomputer internal memory).

In alternative embodiments, the channel order selection scheme of the present invention may be applicable to implementations of the invention in integrated circuits, field programmable gate arrays (FPGAs), chip sets or application specific integrated circuits (ASICs), wired or wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of channel order selection, said method comprising the steps of:
    first performing channel estimation of order L1 on an entire received training sequence to generate a first channel estimate;
    generating a first training sequence portion and a second training sequence portion from said received training sequence;
    second performing channel estimation of order L2 on said first training sequence portion of said received training sequence to generate a second channel estimate;
    third performing channel estimation of order L3 on said second training sequence portion of said received training sequence to generate a third channel estimate;
    calculating a channel estimation error as a function of the difference between said second channel estimate and said third channel estimate;
    selecting channel taps from said first channel estimate that are above a threshold, said threshold generated based on said channel estimation error; and
    wherein L1, L2 and L3 are positive integers.

2. The method according to claim 1, wherein channel order length L2 is equal to channel order length L3.

3. The method according to claim 1, wherein channel order length L2 is not equal to channel order length L3.

4. The method according to claim 1, wherein said channel order lengths L1, L2 and L3 are equal.

5. The method according to claim 1, wherein said step of second performing channel estimation and said third step of third performing channel estimation utilize the same channel estimation technique.

6. The method according to claim 1, wherein said step of second performing channel estimation and said third step of third performing channel estimation utilize different channel estimations techniques.

7. The method according to claim 1, wherein said step of generating comprises dividing said received training sequence such that said first training sequence portion is equal in size to said second training sequence portion.

8. The method according to claim 1, wherein said step of generating comprises dividing said received training sequence such that said first training sequence portion is not equal in size to said second training sequence portion.

9. The method according to claim 1, wherein said steps of first performing channel estimation, second performing channel estimation and third performing channel estimation comprise performing channel estimation based on least squares techniques.

10. The method according to claim 1, wherein said steps of first performing channel estimation, second performing channel estimation and third performing channel estimation comprise performing channel estimation based on correlation techniques.

11. The method according to claim 1, wherein members of said first portion and said second portion overlap.

12. The method according to claim 1, wherein said channel estimation error comprises the variance of the error difference between said second channel estimate and said third channel estimate.

13. The method according to claim 1, wherein said step of selecting channel taps is performed using the following criteria $$|Hini_i|^2 > A \cdot \sigma_H^2$$

wherein $Hini_i$ represents the $i^{th}$ component of said first channel estimate, A is an empirically chosen constant and $\sigma_H$ is said channel estimation error.

14. The method according to claim 1, wherein said channel taps very over time.

15. A method of channel order selection, said method comprising the steps of:
    first performing channel estimation on an entire received training sequence to generate a first channel estimate;
    forming a first training sequence portion and a second training sequence portion from said received training sequence;
    second performing channel estimation on said first training sequence portion and said second training sequence portion to generate a second channel estimate and a third channel estimate, respectively;
    calculating an error estimate as a function of the difference between said second channel estimate and said third channel estimate; and
    selecting those channel taps from said first channel estimate that exceed said error estimate.

16. The method according to claim 15, wherein the same channel estimation techniques are used to generate said second channel estimate and said third channel estimate.

17. The method according to claim 15, wherein different channel estimation techniques are used to generate said second channel estimate and said third channel estimate.

18. The method according to claim 15, wherein said step of forming comprises dividing said received training sequence such that said first training sequence portion is equal in size to said second training sequence portion.

19. The method according to claim 15, wherein said step of forming comprises dividing said received training sequence such that said first training sequence portion is not equal in size to said second training sequence portion.

20. The method according to claim 15, wherein said steps of first performing channel estimation and second performing channel estimation comprise performing channel estimation based on least squares techniques.

21. The method according to claim 15, wherein said steps of first performing channel estimation and second performing channel estimation comprise performing channel estimation based on correlation techniques.

22. The method according to claim 15, wherein the content of said two training sequence portions partially overlap.

23. The method according to claim 15, wherein said step of selecting channel taps is performed using the following criteria $$|Hini_i|^2 > A \cdot \sigma_H^2$$

wherein $Hini_i$ represents the $i^{th}$ component of said first channel estimate, A is an empirically chosen constant and $\sigma_H$ is said channel estimation error.

24. The method according to claim 15, wherein said channel taps very over time.

25. An apparatus for channel order selection, comprising:
    means for first performing channel estimation on an entire received training sequence;
    means for dividing said received training sequence into two non equal training sequence portions of the same size;

means for second performing channel estimation on both said training sequence portions;

means for calculating a noise floor estimate as a function of the difference between channel estimates performed on both said training sequence portions; and means for selecting those channel taps from said channel estimate on the entire received training sequence that exceed said noise floor estimate.

26. A radio receiver, comprising:

a radio frequency (RF) receiver front end circuit for receiving a radio signal transmitted over a channel and downconverting said radio signal to a baseband signal;

a demodulator adapted to demodulate said baseband signal in accordance with the modulation scheme used to generate said transmitted radio signal;

an equalizer adapted to remove intersymbol interference introduced by said channel in accordance with a channel estimation;

a channel estimation module for performing channel order selection comprising signal processing means adapted to:
 calculate a channel estimation of an entire received training sequence to generate a first channel estimate;
 form a first training sequence portion and a second training sequence portion from said received training sequence;
 perform channel estimation on said first training sequence portion and said second training sequence portion to generate a second channel estimate and a third channel estimate, respectively;
 calculate an error estimate as a function of the difference between said second channel estimate and said third channel estimate;
 select those channel taps from said first channel estimate that exceed said error estimate; and a decoder adapted to decode the output of said equalizer to generate output data therefrom.

27. The receiver according to claim 26, wherein the same channel estimation techniques are used to generate said second channel estimate and said third channel estimate.

28. The receiver according to claim 26, wherein different channel estimation techniques are used to generate said second channel estimate and said third channel estimate.

29. The receiver according to claim 26, wherein said step of forming comprises dividing said received training sequence such that said first training sequence portion is equal in size to said second training sequence portion.

30. The receiver according to claim 26, wherein said step of forming comprises dividing said received training sequence such that said first training sequence portion is not equal in size to said second training sequence portion.

31. The receiver according to claim 26, wherein said channel estimations are performed utilizing least squares techniques.

32. The receiver according to claim 26, wherein said channel estimations are performed utilizing correlation techniques.

33. The receiver according to claim 26, wherein the content of said first training sequence portion and said second training sequence portion overlap.

34. The receiver according to claim 26, wherein said step of selecting channel taps is performed using the following criteria $$|Hini_i|^2 > A \cdot \sigma_H^2$$

wherein $Hini_i$ represents the $i^{th}$ component of said first channel estimate, A is an empirically chosen constant and $\sigma_H$ is said channel estimation error.

35. The receiver according to claim 26, wherein said channel taps very over time.

36. The receiver according to claim 26, wherein said receiver is adapted to receive and decode a global system for mobile communications (GSM) cellular signal.

37. A computer program product for use in a communications receiver, said computer program product comprising:

a computer useable medium having computer readable program code means embodied in said medium for performing channel order selection, said computer program product comprising:

computer readable program code means for first performing channel estimation on an entire received training sequence to generate a first channel estimate;

computer readable program code means for forming a first training sequence portion and a second training sequence portion from said received training sequence;

computer readable program code means for channel estimation on said first training sequence portion and said second training sequence portion to generate a second channel estimate and a third channel estimate, respectively;

computer readable program code means for calculating an error estimate as a function of the difference between said second channel estimate and said third channel estimate; and computer readable program code means for selecting those channel taps from said first channel estimate that exceed said error estimate.

38. The computer readable storage medium according to claim 37, wherein said channel estimations are performed utilizing least squares techniques.

39. The computer readable storage medium according to claim 37, wherein said channel estimations are performed utilizing correlation techniques.

40. The computer readable storage medium according to claim 37, wherein the content of said two training sequence portions overlap.

41. The computer readable storage medium according to claim 37, wherein said step of selecting channel taps is performed using the following criteria $$|Hini_i|^2 > A \cdot \sigma_H^2$$

wherein $Hini_i$ represents the $i^{th}$ component of said first channel estimate, A is an empirically chosen constant and $\sigma_H$ is said channel estimation error.

42. The computer readable storage medium according to claim 37, wherein said channel taps very over time.

43. The computer readable storage medium according to claim 37, wherein the same channel estimation techniques are used to generate said second channel estimate and said third channel estimate.

44. The computer readable storage medium according to claim 37, wherein different channel estimation techniques are used to generate said second channel estimate and said third channel estimate.

45. The computer readable storage medium according to claim 37, wherein said computer readable program code means for forming comprises means for dividing said received training sequence such that said first training sequence portion is equal in size to said second training sequence portion.

46. The computer readable storage medium according to claim 37, wherein said computer readable program code means for forming comprises means for dividing said received training sequence such that said first training sequence portion is not equal in size to said second training sequence portion.

* * * * *